United States Patent [19]

Yoshino et al.

[11] Patent Number: 4,702,583
[45] Date of Patent: Oct. 27, 1987

[54] DRIVE DEVICE FOR LENS BARREL AND DIAPHRAGM SHUTTER

[75] Inventors: Tsunemi Yoshino, Nara; Katsuji Ishikawa, Higashiosaka; Hajime Mitsui, Izumi, all of Japan

[73] Assignee: West Electric Co., Ltd., Osaka, Japan

[21] Appl. No.: 936,254

[22] Filed: Dec. 1, 1986

[30] Foreign Application Priority Data

Dec. 3, 1985 [JP] Japan .................. 60-271871

[51] Int. Cl.$^4$ .................... G03B 3/00; G03B 9/08
[52] U.S. Cl. ............................... 354/400; 354/439; 354/195.1; 354/195.12; 354/234.1
[58] Field of Search ............ 354/400, 402, 403, 404, 354/405, 439, 452, 195.1, 195.12, 234.1, 271.1

[56] References Cited

U.S. PATENT DOCUMENTS

| | | | |
|---|---|---|---|
| 3,638,550 | 2/1972 | Hereford | 354/234.1 |
| 3,882,522 | 5/1975 | Erlichman | 354/439 |
| 4,472,039 | 9/1984 | Iwata et al. | 354/271.1 |
| 4,648,701 | 3/1987 | Ogihara et al. | 354/234.1 |

Primary Examiner—W. B. Perkey
Attorney, Agent, or Firm—Stevens, Davis, Miller & Mosher

[57] ABSTRACT

A drive device for a lens barrel and a diaphragm shutter is disclosed. The drive device of this invention comprises a stepping motor including a stator and rotors. The stator is constituted by a plurality of stator members disposed around a lens barrel, each having a bifurcate portion around which a conductor is wound, and the bifurcate portions are disposed in face-to-face relationship with each other with a predetermined space being interposed therebetween. The rotors are respectively disposed in the predetermined spaces. The driving forces of the rotors are independently transmitted at least to the lens barrel including a photographic lens element and to a diaphragm shutter.

3 Claims, 7 Drawing Figures

DRIVE DEVICE FOR LENS BARREL AND DIAPHRAGM SHUTTER

BACKGROUND OF THE INVENTION

1. Field of the Invention

The present invention relates to a drive device for a lens barrel and a diaphragm shutter which incorporates a stepping motor in a photographic lens assembly used in a photographic camera.

2. Description of the Prior Art

Various proposals have heretofore been made with respect to a drive device in which the motion of a diaphragm or a diaphragm shutter in a photographic lens assembly for a photographic camera is controlled by means of a stepping motor as a drive source (hereinafter referred to simply as "ST motor").

For example, U.S. Pat. No. 4,472,039 discloses a drive device for a diaphragm, while U.S. Pat. No. 3,882,522 discloses a drive device for a diaphragm shutter.

The former patent relating to a diaphragm driving device discloses the technical concept that stator means and rotor means constituting an ST motor are respectively formed in a hollow shape, such hollow rotor means being coupled with a diaphragm driving mechanism, and the hollow rotor being rotated forward and backward, thereby driving a diaphragm.

The latter patent relating to a diaphragm-shutter driving device discloses the technical concept that cylindrical ST motor means is disposed in the vicinity of a diaphragm shutter, such diaphragm shutter being driven via gear means by the motion of this ST motor means.

In the actual operation of film exposure, the above-mentioned diaphragm driving operation must be completed within a short time after the shutter has been released. However, if the rotor means is formed in a hollow shape as described previously, that is, if the hollow portion is used as the optical path of a photographic lens assembly, the rotor means is unavoidably increased in size. In consequence, it is hard for the rotor means to quickly start due to its increased size, while it is hard for it to quickly stop due to an inertia force acting on the rotor means. This causes the problem that the diaphragm driving operation cannot be completed within a short time.

On the other hand, if the cylindrical ST motor means is used, it is possible to solve the above-described problem relating to the starting or stopping response of the rotor. However, for example, when the lens barrel and the diaphragm shutter are both to be driven by the motion of the ST motor, the provision of such motor means requires a large space and the overall size of the photographic lens assembly is unnecessarily increased.

SUMMARY OF THE INVENTION

It is therefore an object of the present invention to provide a drive device for a lens berrel and a diaphragm shutter which is compactly housed in a photographic lens assembly, and which incorporates an ST motor capable of exactly driving the lens barrel and the diaphragm shutter within a short time after a shutter releasing operation has been completed.

It is another object of the present invention to provide a drive device for a lens barrel and a diaphragm shutter comprising:

ST motor means including a stator and a plurality of rotors; such stator including a plurality of stator members, each having a conductor and an iron core provided with a bifurcate portion around which the conductor is wound, the stator members being assembled so that the bifurcate portions of their iron cores are arranged in face-to-face relationship with each other with a predetermined space interposed therebetween, a plurality of the thus-assembled stator members being disposed around a lens barrel, the rotors being respectively disposed in the predetermined spaces formed between the assembled stator members;

lens moving means for moving the lens barrel in the direction of its optical axis by transmitting the rotary force of one of the plurality of rotors to the lens barrel;

diaphragm shutter driving means for driving a diaphragm shutter by transmitting the rotary force of another of the plurality of rotors to the diaphragm shutter; and control circuit means for controlling the energized state of each of the conductors wound around the stator members of the ST motor on the basis of a photographic data signal supplied from a component, such as a distance-metering or exposure-control unit.

It is yet another object of the present invention to provide a drive device for a lens barrel and a diaphragm shutter, which further comprises: worm gear means rotatably disposed on the body of the photographic lens assembly including the lens barrel and the diaphragm shutter, the rotary force of yet another of the plurality of rotors being transmitted to the worm gear means; and an outer cylinder which houses the above-mentioned body, including a gear portion engaged with the worm gear means; the lens barrel and the diaphragm shutter in themselves being movable in the direction of the optical axis of the lens barrel.

The above and other objects, features and advantages of the present invention will become apparent from the following description of the preferred embodiments thereof, taken in conjunction with the accompanying drawings.

DESCRIPTION OF THE PREFERRED EMBODIMENTS

Figure 1:
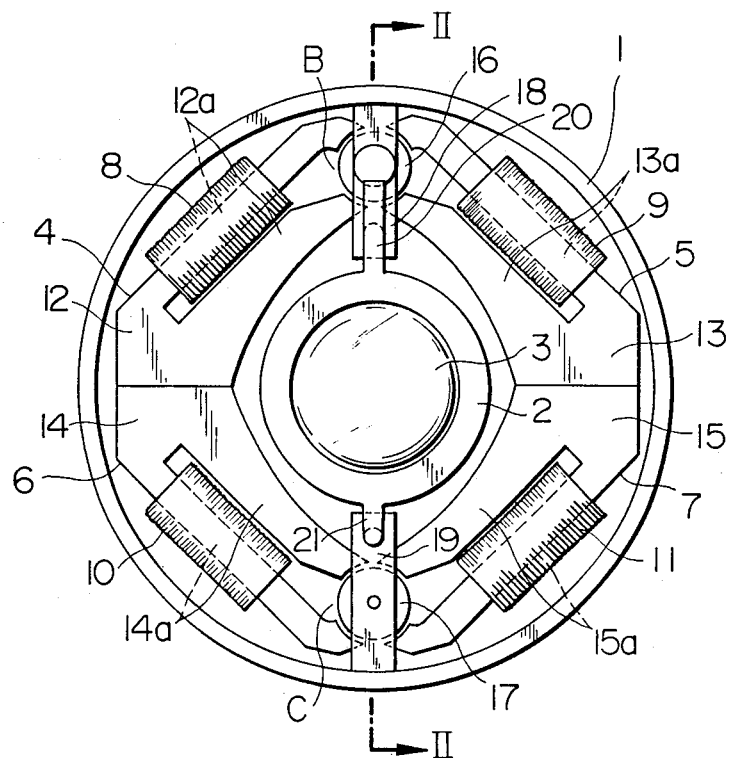
FIG. 1 is a front elevational view diagrammatically showing a first preferred embodiment of a drive device for a lens barrel and a diaphragm shutter in accordance with the present invention.
Figure 2:
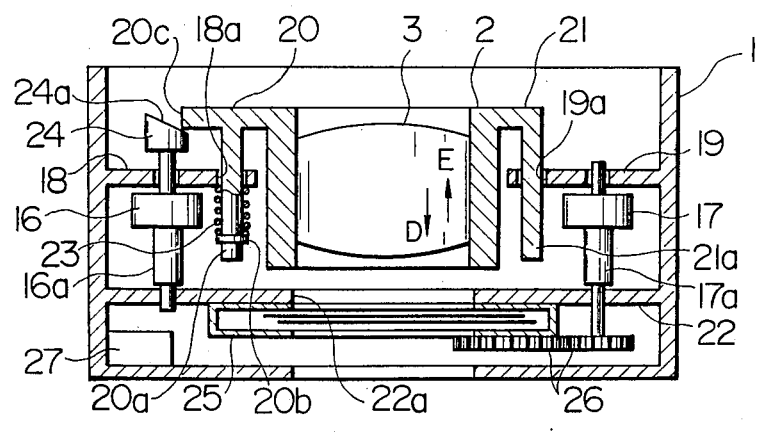
FIG. 2 is a diagrammatic cross-sectional view taken along the line II—II of FIG. 1.

FIG. 1 is a front elevational view diagrammatically showing the first preferred embodiment of a drive device for a lens barrel and a diaphragm shutter of a photographic lens assembly in accordance with the present invention, and FIG. 2 is a diagrammatic cross-sectional view taken along the line II—II of FIG. 1. As shown in FIGS. 1 and 2, a photographic-lens-assembly body 1 includes a central lens barrel 2 having a photographic lens element 3 therein.

Stator members 4, 5, 6 and 7 are disposed around the lens barrel 2, such stator members 4, 5, 6 and 7 respectively including: conductors 8, 9, 10 and 11; and iron cores 12, 13, 14 and 15. The iron cores 12, 13, 14 and 15 respectively have bifurcate portions 12a, 13a, 14a and 15a, the conductors 8, 9, 10 and 11 being respectively wound around the portions 12a, 13a, 14a and 15a. Accordingly, the conductors 8, 9, 10, 11 make, when energized, the iron cores 12, 13, 14, 15 serve as electromagnets.

As can be seen from FIGS. 1 and 2, in the first preferred embodiment, the stator members 4 and 5 are assembled so that the bifurcate portions 12a and 13a of their respective iron cores 12 and 13 are arranged in face-to-face relationship with each other with a predetermined space B interposed therebetween. Similarly, the stator members 6 and 7 are assembled so that the bifurcate portions 14a and 15a of the respective iron cores 14 and 15 are arranged in face-to-face relationship with each other with a predetermined space C interposed therebetween. The thus-assembled stator members 4, 5, 6 and 7 constitute a stator which forms an ST motor together with rotors described below.

The predetermined spaces B and C respectively receives therein rotors 16 and 17 each of which is made of a permanent magnet which is magnetized in several polarities, such rotors 16 and 17 constituting the ST motor together with the stator constituted by the stator members 4, 5, 6 and 7.

It should be noted that, since the first embodiment has the above-described construction, the size of the ST motor can be reduced along a transverse line crossing the rotational axes of the rotors 16, 17 and the optical axis of the lens barrel 2, that is, the vertical length or width of the ST motor as viewed in FIG. 1 can be reduced as compared with that of a known cylindrical ST motor.

Support members 18 and 19 extend inward from the body 1, and movably support the corresponding rotors 16 and 17 as well as the lens barrel 2. As clearly shown in FIG. 2, the lens barrel 2 is provided with control means 20 and 21 for controlling the axial movement of the lens barrel 2. The control means 20 and 21 respectively have sliding rods 20a and 21a which are respectively fitted into holes 18a and 19a formed in the support members 18 and 19. The direction of movement of the lens barrel 2 is restricted by the respective engaged relationships between the holes 18a, 19a and the sliding rods 20a, 21a.

The rotors 16 and 17 are rotatably supported by the aforementioned support members 18 and 19 as well as a support base plate 22 which is secured to or integral with the body 1.

The support base plate 22 has a central aperture 22a as the optical path for film exposure.

A spring 23 is fitted on a portion of the sliding rod 20a of the control means 20, such portion being confined between a projection 20b formed on the sliding rod 20a and the support member 18. The spring 23 consistently urges the lens barrel 2 in the direction of an arrow D shown in FIG. 2.

The rotor 16 has rotary shaft 16a, and a cam member 24 having a cam surface 24a is sequred to or integral with one end of the rotary shaft 16a. As clearly shown in FIG. 2, the cam surface 24a is consistently forced against an end 20c of the control means 20 by virtue of the force applied by the spring 23.

The support base plate 22 has a shutter assembly 25 which includes: a plurality of diaphragm-shutter blades arranged such that the aperture formed by the blades are freely opened and closed; and a driving pin (shown in FIG. 4) arranged to control the opening and closing movement of the aperture.

The rotary force of the rotor 17 is transmitted to the driving pin through a gear train 26 coupled with a rotary shaft 17a of the rotor 17.

The angle and direction of rotation of each of the rotors 16 and 17 are determined by a control circuit 27 shown in FIG. 2, such control circuit 27 being arranged to control the energized state of each of the conductors 8, 9, 10 and 11 which are respectively wound around the stator members 4, 5, 6 and 7, in accordance with photographic data signals supplied from a distance-metering or exposure-control unit (not shown).

The following description will be made of the operation of the first embodiment of a drive device for a lens barrel and a diaphragm shutter in accordance with present invention which comprises the construction shown in FIGS. 1 and 2. First of all, the rotary motion of the ST motor comprising the stator members 4, 5, 6, 7 and the rotors 16, 17 will be described below with reference to FIGS. 3a and 3b respectively showing the diagrammatic construction of a portion of the ST motor.

Figure 3A:
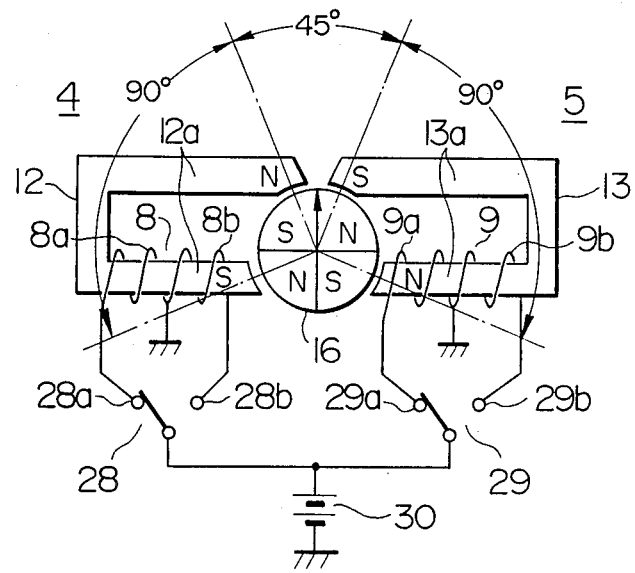
FIGS. 3a and 3b are respectively diagrammatic views showing the rotary motion of an ST motor incorporated in the first preferred embodiment shown in FIG. 1.
Figure 3B:
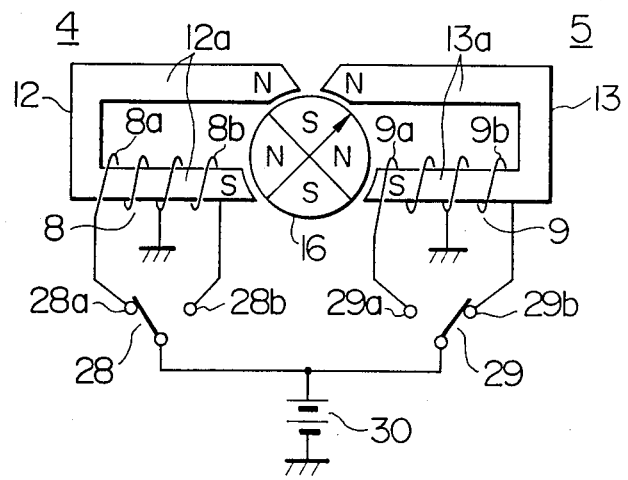

In this first preferred embodiment, it is assumed that a permanent magnet constituting each of the rotors 16 and 17 is magnetized in four polarities, and that, for example, the iron cores 12 and 13 respectively constituting the stator members 4 and 5 are arranged as shown in FIG. 3a, the respective rotors 16 and 17 (solely the rotor 16 is shown in FIGS. 3a and 3b) may be rotated through 45 degrees (or one-eighth of one rotation) at each step. Specifically, the iron cores 12 and 13, for example, are disposed so that the polarized ends of their respective bifurcate portions 12a and 13a which are magnetized relative to the polarities of the rotor 16 are spaced apart at about 90° relative to each other, with reference to the longitudinal axis of the rotor 16. The two adjacent polarized ends of the opposite iron cores 12 and 13 (the upper ends as viewed in FIG. 3a) are arranged to form about 45° with reference to the longitudinal axis of the rotor 16.

In addition, as shown in FIG. 3a, the distal ends of the conductors 8 and 9 wound around the iron cores 12 and 13 are respectively connected to the high-potential terminals of an electric power supply 30 through associated selector switches 28 and 29 which constitute the previously mentioned control circuit 27, while the middle points of the same are connected to the low-potential terminals of the electric power supply 30. Specifically, the conductor 8 is electrically separated into winding portions 8a and 8b; whereas the conductor 9 is electrically separated into winding portions 9a and 9b.

The operation of the first embodiment will be described below with illustrative reference to the state shown in FIG. 3a.

As shown, if the selector switches 28 and 29 are respectively connected to selector terminals 28a and 29a, electric current is allowed to flow in the winding portions 8a and 9a of the conductors 8 and 9. Thus, each of the stator members 4 and 5 is magnetized in the polarities shown in FIG. 3a, so that the rotor 16 is, as shown in FIG. 3a, held in position in a state wherein the four magnetic poles of the rotor 16 respectively attract the counter magnetic poles of the stator members 4 and 5.

In this state, when the selector switch 29 is switched to a selector terminal 29b, the two excited polarities of the stator member 5 are relatively reversed. Thus, in response to such reversed polarities, the rotor 16 is forced to rotate clockwise through 45 degrees until it stops at the position shown in FIG. 3b, namely, the position where the aforementioned reversed polarities respectively attract the corresponding opposite polarities of the stator members 4 and 5.

Subsequently, the selector switches 28 and 29 are alternately changed over between the selector terminals 28a and 28b; 29a and 29b, respectively, and, in response to each switching operation, the rotor 16 is forced to rotate clockwise through 45° at each step.

The following table shows such a stepped motion. The arrows shown in the table indicate the direction in which the rotor 16 is turned, and such arrows are equivalent to the arrow marked in the rotor 16 of FIGS. 3a and 3b. It should be noted that the direction of rotation of the rotor 16 can be controlled by reversing the switching sequence of the respective selector switches 28 and 29. Although the motion of the rotor 17 is not particularly described, the rotor 17 is also moved, similar to the rotor 16.

TABLE

| Rotor direction | Connection terminal 28 | Connection terminal 29 |
|---|---|---|
| ↑ | 28a | 29a |
| ↗ | 28a | 29b |
| → | 28b | 29b |
| ↘ | 28b | 29a |
| ↓ | 28a | 29a |
| ↙ | 28a | 29b |
| ← | 28b | 29b |
| ↖ | 28b | 29a |
| ↑ | 28a | 29a |

The rotors 16 and 17 shown in FIG. 1 are respectively forced to rotate in accordance with the above-described operation.

The following description will be made of the operation of the drive device for a lens barrel and a diaphragm shutter shown in FIGS. 1 and 2. First of all, the motion of the lens barrel 2 will be described below.

As described previously, the lens barrel 2 is normally forced in the direction of the arrow D by virtue of the spring 23, and the end 20c of the control means is urged against the cam surface 24a of the cam member 24 which is disposed on one end of the rotary shaft 16a of the rotor 16 in such a manner as to rotate in interlocking relationship with the rotor 16. Therefore, the rotation of the rotor 16 alters the state of the contact between the end 20c and the cam surface 24a. In consequence, the lens barrel 2 is made to travel in the direction of the arrow either D or E shown in FIG. 2, namely, in the direction of the optical axis of the lens barrel 2.

In other words, the lens barrel 2 is moved against or by the urging force of the spring 23 in response to the rotation of the cam member 24, and thus is forced to travel back and forth along the optical axis in accordance with the positional relationships between the hole 18a of the support member 18 and the sliding rod 20a of the control means 20; and that between the hole 19a of the support member 19 and the sliding rod 21a of the control means 21.

This movement of the lens barrel 2 along its optical axis enables a focusing operation. Specifically, each of the selector switches 28 and 29 corresponding to the control circuit 27 is constituted by a combination of electrical switch elements, and this combination is changed in accordance with the data on a distance to an object which are supplied from a known distance-metering unit. If the energized state of each of the windings 8 and 9 is controlled in response to such changing, that is, if the number of rotational steps of the rotor 16 is preset in accordance with the subject-distance data, it becomes possible to perform an automatic focusing operation.

The following description concerns the operation of driving the diaphragm shutter in the first preferred embodiment.

Figure 4:
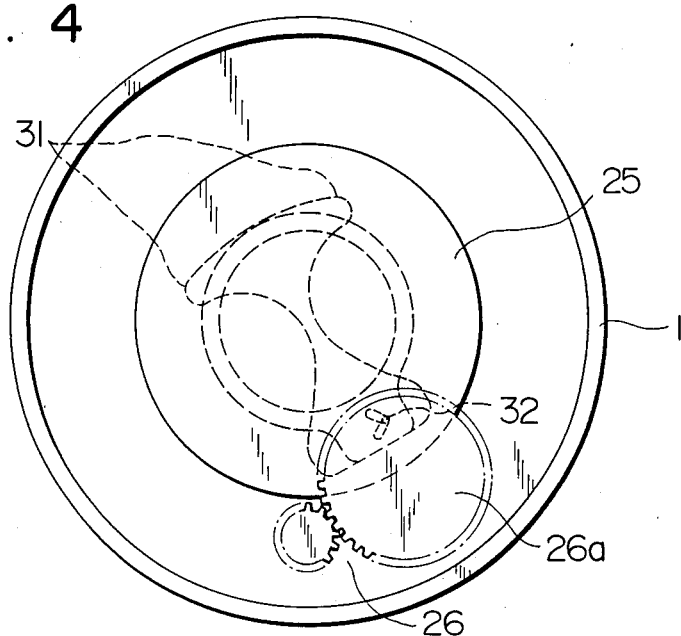
FIG. 4 is a diagrammatic rear side elevation of the first preferred embodiment, but partially showing one of the rotors and associated parts incorporated in the interior which is not normally visible from the exterior.

FIG. 4 is a partial, rear side elevation of the rotor 17 and its periphery which is viewed from the rear side of the first embodiment shown in FIG. 1. As shown, the known diaphragm shutter assembly 25 includes a plurality of diaphragm shutter blades 31 and a driving pin 32 for driving the blade 31, such driving pin 32 being coupled with one gear 26a of the gear train 26 which is rotated in linked relationship with the rotor 17.

Therefore, as the rotor 17 is rotated, the gear 26a of the gear train 26 is rotated, thereby driving the driving pin 32. In consequence, the plurality of diaphragm shutter blades 31 within the diaphragm shutter assembly 25 are opened and closed in response to each rotation of the rotor 17.

It should be noted that, similar to the previously described rotor 16, the angle and direction of rotation of the rotor 17 can be controlled by controlling the energized state of the conductors 10 and 11 of the respective stator members 6 and 7. Therefore, although not shown in the drawings, the diaphragm-shutter operation can be performed by controlling such energized state through the control circuit 27 in accordance with the object-brightness data supplied from a presently known exposure control unit.

The foregoing description concerns the first embodiment of a drive device for a lens barrel and a diaphragm shutter shown in FIGS. 1 and 2 in accordance with the present invention. The following description relates to the second preferred embodiment of the drive device of this invention. In the second embodiment the arrangement according to this invention is used in a bifocal camera employing the above-described first embodiment for a primary lens group and further including an auxiliary lens element adapted to be inserted into the optical path, thereby enabling changeover between different focal lengths, and is used as a focussing section for normal zoom lens assembly.

In the second embodiment, although detailed descriptions are omitted, it is ocassionally necessary to shift the entire mechanism shown in the first embodiment shown in FIG. 1. More specifically, in the former bifocal camera, it is necessary to shift such entire mechanism so as to form a space which allows the auxiliary lens element to be inserted into the optical path. On the other hand, in the latter zoom lens, it is occasionally preferable to shift such entire mechanism in order to correct variations in an in-focus state which might be caused by variations in the focal length, for example, when the zoom lens is operated in its macro-focus range.

Figure 5:
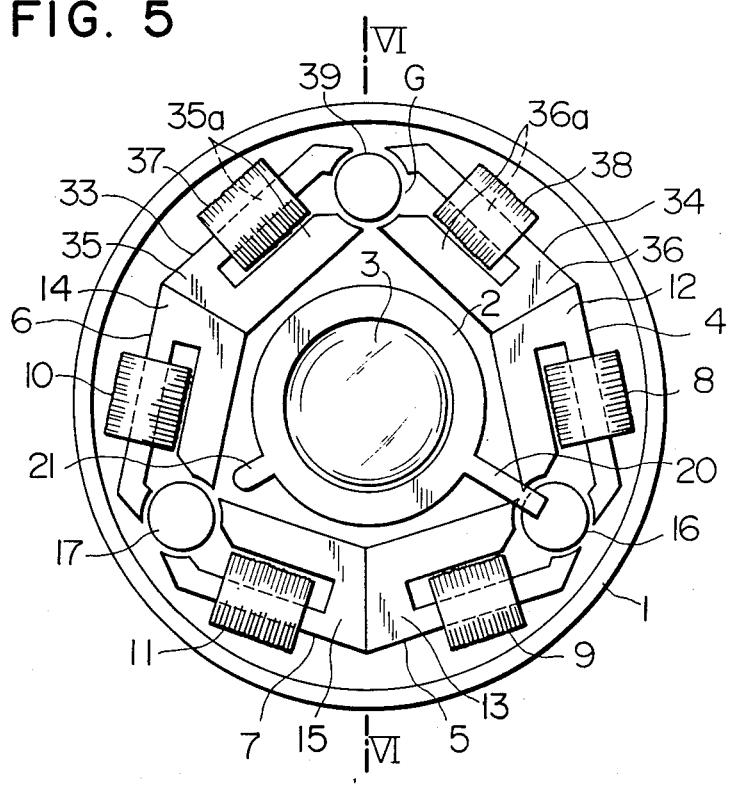
FIG. 5 is a front elevational view similar to FIG. 1, but showing a second preferred embodiment of a drive device for a lens barrel and a diaphragm shutter in accordance with the present invention.
Figure 6:
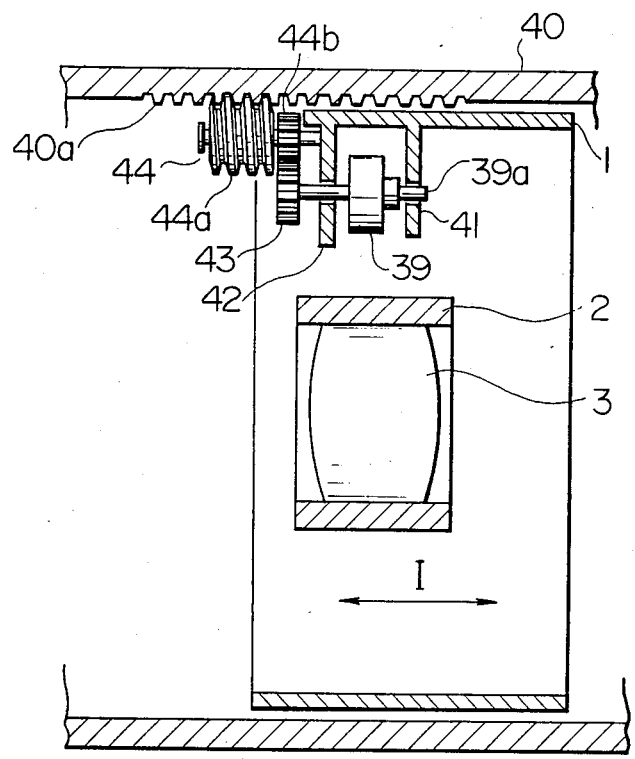
FIG. 6 is a diagrammatic cross-sectional view taken along the line VI—VI of FIG. 5.

FIGS. 5 and 6 respectively illustrate the second preferred embodiment of a drive device for a lens barrel and a diaphragm shutter which is devised by considering the above-described problems in accordance with the present invention. FIG. 5 is a front elevational view diagrammatically showing the sole ST motor which constitutes the essential portion of the second embodiment, and FIG. 6 is an essential, diagrammatic cross-sectional view taken along the line VI—VI of FIG. 5, but showing the essential portion of the second preferred embodiment. In FIGS. 5 and 6, like reference numerals are used to denote like or corresponding elements which constitute each of the components shown in FIG. 1.

As shown in FIG. 5, stator members 33 and 34 are disposed around the lens barrel 2, and respectively include conductors 37 and 38; iron cores 35 and 36. The iron cores 35 and 36 respectively have bifurcate portions 35a and 36a, such portions 35a and 36a respectively have the conductors 37 and 38 wound therearound, being disposed in face-to-face relationship with each other. A predetermined space G is formed between the two adjacent ends of the portions 35a and 36a.

The predetermined space G includes a rotor 39 which constitutes the ST motor together with the stator members 33 and 34.

The structure shown in FIG. 5 is movably disposed on an outer cylinder 40 shown in FIG. 6, and they are coupled with each other by the engagement between a later-described worm gear 44 and a gear portion 40a formed on the inner circumferential surface of the outer cylinder 40.

A rotor 39 is rotatably supported by support members 41 and 42 which are fixed to or integral with the body 1, and a gear 43 is fixed to or integral with one end of a shaft 39a of the rotor 39.

The worm gear 44 has a gear portion 44a meshed with the gear portion 40a of the outer cylinder 40 and a gear portion 44b meshed with the gear 43, being rotatably disposed on the body 1.

The following description concerns the rotary motion of each of the rotors 16, 17 and 39 used in the second embodiment shown in FIGS. 5 and 6. However, since the rotary motion of the respective rotors 16 and 17 are the same as that of the first embodiment, the description of the rotors 16 and 17 is omitted for the sake of simplicity and the sole rotary motion of the rotor 39 will be described.

As clearly shown in FIG. 6, the rotor 39 is rotatably carried on the body 1, and, as the rotor 39 is rotated, the gear 43 mounted on the shaft 39a is interlockingly rotated.

The gear 43 is meshed with the gear portion 44b of the worm gear 44, so that, as the gear 43 is rotated, the gear 44a of the worm gear 44 is made to rotate.

The gear 44a is meshed with the gear 40a formed on the inner circumferential surface of the outer cylinder 40, and is rotatably disposed on the body 1. In consequence, the rotation of the gear 44a forces the body 1 including the gear 44 per se to move linearly in the directions of a double headed arrow I.

Accordingly, if an auxiliary lens element is inserted into a space formed after such movement is completed, or if the distance of such movement is determined by considering a variable focal length, this invention can easily be applied to the aforementioned bifocal camera.

It will be appreciated from the foregoing that the angle and the direction of rotation of the rotor 39 can be determined by suitably controlling the energized state of the conductors 37 and 38 of the respective stator members 33 and 34, similar to the first embodiment. In the first and second embodiments, the iron cores are disposed in a separate relationship with each other. However, two adjacent iron cores with no rotor interposed therebetween, for example, a pair of the iron cores 12 and 14 or a pair of iron cores 13 and 15 could be formed integrally with each other.

As will be readily understood by those skilled in the art, the present invention provides a drive device for a lens barrel and a diaphragm shutter comprising: ST motor means including a stator and a plurality of rotors; such stator including a plurality of stator members, each having a conductor and an iron core provided with a bifurcate portion around which the conductor is wound, the stator members being assembled so that the bifurcate portions are arranged in face-to-face relationship with each other with a predetermined space interposed therebetween, a plurality of the thus-assembled stator members being disposed around a lens barrel, the rotors being respectively disposed in the predetermined spaces defined between the adjacent assembled stators. As the aforementioned rotors are rotated, the lens barrel and the diaphragm shutter are driven independently of each other. Therefore, when the ST motor is to be designed, it is sufficient merely to consider the minimum required torque of the motor. In consequence, the length of a line passing through the axes of the lens barrel and the rotors can be reduced without requiring the rotors to be hollow, i.e., by using small-sized solid cylindrical rotors as they are. Accordingly, the present invention provides the following favorite merits. The overall size of the photographic lens assembly can be reduced. The rotor can be easily started, and yet can be easily stopped since inertia is small. In addition, the rotors can also be driven at high speed since such starting and stopping operations can be easily effected.

Moreover, when it is necessary to vary the absolute positions of the lens barrel and the diaphragm shutter in themselves, such positional change can be successfully effected merely by increasing the number of the stator members and the rotors which are assembled around the lens barrel, that is, without unnecessarily increasing the size of the photographic lens assembly.

What is claimed is:

1. A drive device for a lens barrel and a diaphragm shutter comprising:

stepping motor means including a stator and a plurality of rotors; said stator including a plurality of stator members, each having a conductor and an iron core provided with a bifurcate portion around which said conductor is wound, said stator members being assembled so that said bifurcate portions are arranged in face-to-face relationship with each other with a predetermined space interposed therebetween, said plurality of assembled stator members being disposed around a lens barrel, said respective rotors being rotatably disposed in said predetermined spaces defined between said assembled stator members;

lens moving means for moving said lens barrel in the direction of its optical axis by transmitting the rotary force of one of said plurality of rotors to said lens barrel;

diaphragm-shutter driving means for driving a diaphragm shutter provided in a body accommodating said lens barrel by transmitting the rotary force of another of said plurality of rotors to said diaphragm shutter;

control circuit means for controlling the energized states of said respective conductors on the basis of a photographic data signal supplied from a component such as a distance-metering or exposure-control unit.

2. A drive device for a lens barrel and a diaphragm shutter according to claim 1, further comprising transmission means for transmitting the rotary force of yet another of said plurality of rotors to worm gear means engaged with gear means which is rotatably disposed on said body accommodating said lens barrel and said diaphragm shutter, and which is disposed on the inner periphery of an outer cylinder movably including said body, thereby enabling the movement of said body.

3. A drive device for a lens barrel and a diaphragm shutter according to claim 1, wherein said stepping motor includes at least one iron core having bifurcate portions on the opposite ends.

* * * * *